UNITED STATES PATENT OFFICE.

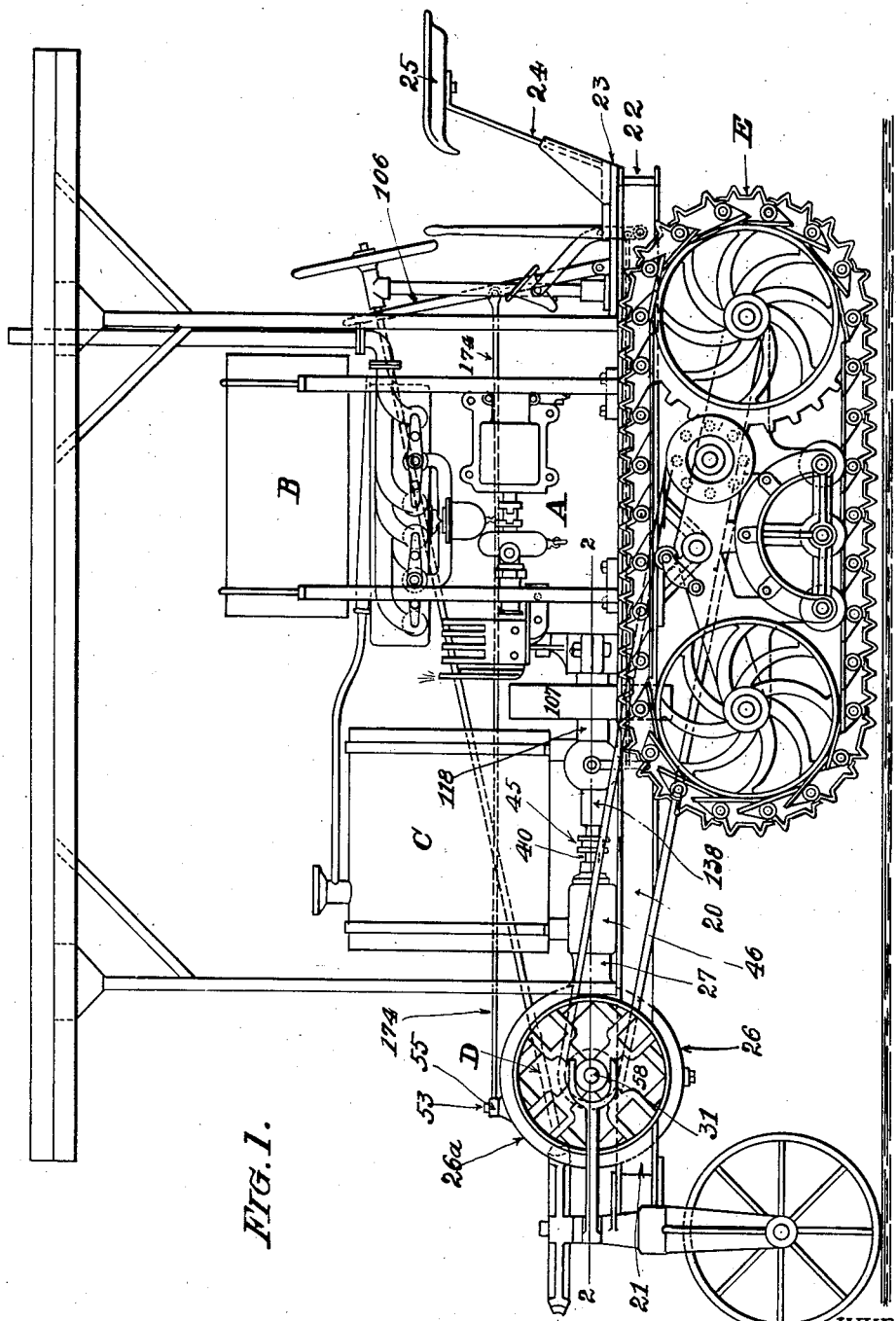

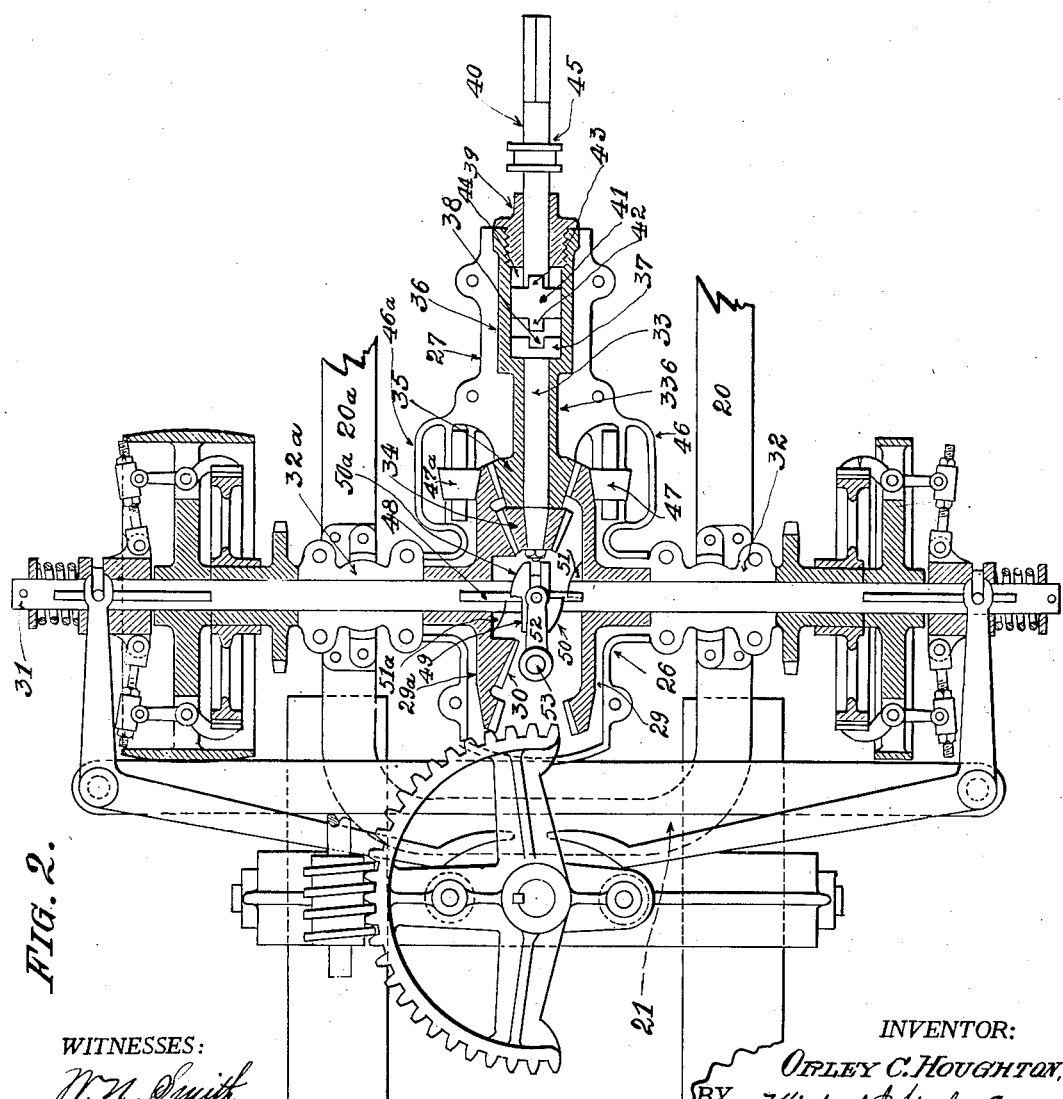

ORLEY C. HOUGHTON, OF CHICAGO, ILLINOIS, ASSIGNOR TO BULLOCK TRACTOR CO., OF CHICAGO, ILLINOIS, A CORPORATION OF ILLINOIS.

TRANSMISSION-GEARING.

1,186,196.  Specification of Letters Patent.  Patented June 6, 1916.

Original application filed September 26, 1914, Serial No. 863,724. Divided and this application filed May 6, 1915. Serial No. 26,341.

*To all whom it may concern:*

Be it known that I, ORLEY C. HOUGHTON, a citizen of the United States, and resident of Chicago, in Cook county, State of Illinois, have invented certain new and useful Improvements in Transmission-Gearing, the same being a division of my application for patent on traction - engines, Serial No. 863,724, filed September 26, 1914; and I do hereby declare that the following description of my said invention, taken in connection with the accompanying sheets of drawings, forms a full, clear, and exact specification, which will enable others skilled in the art to which my said invention appertains to make and use the same.

This invention has general reference to traction engines; and it is especially directed to the transmission gearing by which the endless track-bands are operated, the object being the production of an efficient, serviceable, and durable tractor.

My invention, therefore, consists, essentially in the novel and peculiar combination of parts, and details of construction, as hereinafter first fully set forth and described, and then pointed out in the claim.

In the drawings already mentioned, which serve to illustrate this invention in its preferred embodiment, Figure 1 is a side elevation of my improved tractor. Fig. 2 is a plan of the forward position of this machine, the transmission gearing employed being in section, the sectional portion being on line 2—2 of Fig. 1.

Like parts are designated by the same symbols and characters of reference in the figures.

20, 20ª, in the drawings designates the chassis or main frame of this machine. It is, preferably, an I-beam of sufficient depth to carry the superposed load, said I-beam being bent at its forward end so as to resemble the letter U, this portion of the beam being designated by the reference numeral 21. The rear terminals of this I-beam 20, 20ª, are connected by a channel, or angle bar 22, and by a floor or platform 23, upon which the operator of the machine takes his position; there being an upwardly and rearwardly extending support 24, mounted on the platform 23, which support carries a seat 25, for said operator.

Adjacent to the platform 23 there is located upon the chassis, a motor A, preferably of the internal combustion type of engines, which motor is supplied with liquid fuel from an overhead tank B, and cooled by a cooler or condenser C, of usual and approved design.

Near the forward end of the chassis there is located the transmission D, by which motion is communicated from the motor A, to a pair of trucks E, located one on each side of the machine at the rear portion thereof. Transmission D includes a gear case 26, 26ª, having a rearwardly-extending bearing 27, in which there is located a clutch, to be hereinafter more fully described. In the main portion 26, 26ª, of this gear case there is located a pair of oppositely-facing bevel gear wheels 29, 29ª, the latter of which has, concentric to the outer circle of cogs, a further, smaller, circle of cogs 30, said bevel gear wheels 29, 29ª, being loosely mounted on a transverse shaft 31, having bearings, 32, 32ª, formed, preferably integrally, with the main or lower portion 26 of said gear case; caps of usual design, not shown, being located on these bearings to confine the shaft 31 in proper position. Longitudinally of the chassis, and entirely within the gear-case there is a shaft 33, at the forward end of which there is secured a bevel pinion 34, meshing with the inner circle of cogs 30. This shaft 33 rotates freely in a tubular member 336, and it is provided at its forward extremity, and preferably formed integrally with the tubular member 336, with a bevel pinion 35, coacting with the larger circles of cogs of said bevel wheels 29, 29ª. At its rear end this tubular member 336 is provided with an enlarged cylindrical portion 36.

At the rear end of shaft 33 there is a collar 37, having in its rear face a transverse groove or clutch jaw 38. The cylindrical portion 36 is internally screw-threaded at its rear end to receive an axially bored cap 39, through the bore of which passes a short shaft 40, having at its forward end a head 41, said head having at its forward flank a transverse projection or clutch-jaw 42, constructed to engage the transverse groove 38, and at its rear flank similar projections 43, constructed to engage coacting transverse grooves or clutch jaws 44, formed on the inner face of the cap 39. This shaft 40 carries a shifter collar 45, by means of which, and suitable mechanism, said shaft 40 may be laterally moved to cause either the projection 42 to engage the groove 38, or the projection 43 to engage the groove 44 according in which direction said shaft 40 is moved.

The gear case has two, sidewise-projecting portions 46, 46ª, in which are located rollers 47, 47ª, constructed to bear against the rear flanks of the bevel gear wheels 29, 29ª, to counteract the thrust exerted on the two bevel wheels when being rotated by the bevel pinions 34 and 35.

Medially, the transverse shaft 31 has a spline 48; and on the shaft there is a sidewise movable clutch member 49, having jaws 50, 50ª, constructed to engage similar jaws 51, formed on the flank of the bevel gear wheel 29, or jaws 51ª, formed on the bevel gear wheel 29ª, a forked lever 52, being provided, which lever is secured to the lower end of a vertically-disposed shaft 53, mounted in the cover 26ª of the gear case, and projecting therefrom, a lever 55, being secured to the protruding end of shaft 53 to move said clutch member 49, said lever 55 being connected to an upstanding handle bar 106 located on the rear platform, by a rod 174.

Movement is transmitted to the endless track bands, by mechanism which is fully described in the parent application hereinbefore recited, and to which reference may be had for a full disclosure thereof.

The fly-wheel 107 of the motor A is connected to the transmission shaft 40, in any suitable manner to transmit rotative movement to said transmission shaft.

To reverse the movement of the tractor, the shaft 40 is moved lengthwise to cause the disengagement of one pair of its clutch jaws, and the engagement of the other pair of its clutch jaws, as already hereinbefore described.

In order that there be no sliding movement between the antifriction rollers 47 and 47ª, and the bevel gear wheels 29 and 29ª, these rollers are made conical and the rear flanks of said bevel gear wheels are beveled at their contacting margins, as clearly illustrated in Fig. 2.

I have heretofore described the preferred embodiment of my invention; but I desire it to be understood that many of the details of construction, and the arrangement of parts, may be changed and modified by persons skilled in the arts to which my invention appertains, without departing from the scope of the subjoined claim.

Having thus fully described this invention, I claim as new, and desire to secure to myself by Letters Patent of the United States—

In a motor vehicle, transmission gearing, including a driven shaft, a gear case, said gear case having journals in which said driven shaft is constructed to rotate, two oppositely-facing bevel gear wheels loosely mounted on said driven shaft in spaced relation, one of said bevel-wheels having two concentric circles of gear teeth on its inner face, the other bevel gear wheel having a single marginal circle of gear teeth, each of said bevel wheels having on its inner face clutch-knuckles, a slidable clutch sleeve splined on said driven shaft between said bevel wheels, said clutch sleeve having on its flanks clutch knuckles constructed to engage one or the other of the clutch-knuckles on said bevel wheels, the rear flanks of said bevel wheels being marginally beveled, side-extensions on said gear case, taper friction rollers mounted in said side-extensions and constructed to bear on the marginal beveled portions of said bevel wheels, a further central extension on said gear case, a tubular shaft rotatably mounted in the latter extension, said tubular shaft having at one end a bevel pinion constructed to engage the outer circles of gear teeth on said bevel gear wheels, and at its other end a cylindrical enlargement, said enlargement being internally screw-threaded, a tubular cap in screw-threaded engagement with the cylindrical enlargement, the inner face of said cap having clutch knuckles, a shaft rotatably mounted in the tubular shaft aforesaid, a bevel pinion at one end of the said shaft constructed to engage the inner circle of teeth of one of said bevel wheels, said shaft having at its other end a head, there being on the outer flank of said head clutch knuckles, a longitudinally slidable driving shaft, said driving shaft terminating in the bore of said cylindrical portion of the tubular shaft, said terminal of said driving shaft having a collar, clutch-knuckles at both flanks of this collar, means for longitudinally sliding said driving shaft to cause the knuckles on its head to engage the knuckles on the cap or the knuckles on the pinion shaft, a vertically disposed shaft journaled in the gear case, and protruding therefrom, a forked arm at the lower end of said vertical shaft constructed to engage the slidable clutch sleeve, an arm at the outer end of said vertical shaft, means constructed to oscillate said vertical shaft by said latter arm, and means for rotating said driving shaft.

In testimony that I claim the foregoing as my invention I have hereunto set my hand, in the presence of two subscribing witnesses.

ORLEY C. HOUGHTON.

Witnesses:
MICHAEL J. STARK,
J. M. HEDLUND.